(12) United States Patent
Vierheilig

(10) Patent No.: US 8,197,669 B2
(45) Date of Patent: Jun. 12, 2012

(54) ADDITIVES FOR METAL CONTAMINANT REMOVAL

(75) Inventor: Albert A. Vierheilig, Savannah, GA (US)

(73) Assignee: Intercat, Inc., Sea Girt, NJ (US)

( * ) Notice: Subject to any disclaimer, the term of this patent is extended or adjusted under 35 U.S.C. 154(b) by 680 days.

(21) Appl. No.: 12/277,434

(22) Filed: Nov. 25, 2008

(65) Prior Publication Data

US 2010/0025297 A1    Feb. 4, 2010

Related U.S. Application Data

(62) Division of application No. 11/220,234, filed on Sep. 6, 2005, now abandoned.

(60) Provisional application No. 60/608,038, filed on Sep. 8, 2004.

(51) Int. Cl.
*C10G 11/05* (2006.01)
*C10G 11/00* (2006.01)
*C10G 11/02* (2006.01)
*C10G 11/04* (2006.01)

(52) U.S. Cl. ................ 208/119; 208/113; 208/118

(58) Field of Classification Search ............... 208/113
See application file for complete search history.

(56) References Cited

U.S. PATENT DOCUMENTS

| | | | |
|---|---|---|---|
| 4,252,635 A | 2/1981 | Blanton, Jr. | |
| 4,259,176 A | 3/1981 | Blanton et al. | |
| 4,465,588 A | 8/1984 | Occelli et al. | |
| 4,650,564 A | 3/1987 | Occelli et al. | |
| 4,657,779 A | 4/1987 | Gaske | |
| 4,708,786 A | 11/1987 | Occelli | |
| 4,889,615 A * | 12/1989 | Chin et al. | 208/113 |
| 4,944,865 A | 7/1990 | Occelli et al. | |
| 5,071,807 A | 12/1991 | Kennedy et al. | |
| 5,141,624 A * | 8/1992 | Liao et al. | 208/113 |
| 5,174,890 A | 12/1992 | Occelli | |
| 5,260,240 A | 11/1993 | Guthrie et al. | |
| 5,559,067 A | 9/1996 | Lerner et al. | |
| 6,028,023 A | 2/2000 | Vierheilig | |
| 6,479,421 B1 | 11/2002 | Vierheilig | |
| 6,656,347 B2 | 12/2003 | Stockwell et al. | |
| 6,673,235 B2 | 1/2004 | Harris et al. | |
| 6,696,378 B2 | 2/2004 | Gibson et al. | |
| 6,716,338 B2 * | 4/2004 | Madon et al. | 208/120.01 |
| 6,929,736 B2 | 8/2005 | Vierheilig | |
| 2003/0096697 A1 | 5/2003 | Vierheilig | |

FOREIGN PATENT DOCUMENTS

WO    02/064703 A2    8/2002

OTHER PUBLICATIONS

Hirschberg and Bertolacini, "Catalytic Control of SOx Emissions from Fluid Catalytic Cracking Units," ACS Symposium Series, 375, 114-145 (1988).
Wormsbecher et al., "Vanadium Poisoning of Cracking Catalyst: Mcihanism of Poisoning and Design of Vanadium Tolerant Catalyst Systems," J. Catal, 100, 130-137 (1986).
International Search Report and Written Opinion from PCT/US2005/031649, Oct. 27, 2006.
Prosecution history of U.S. Appl. No. 11/220,234.
Notification of the First Office Action from the State Intellectual Property Office of the People's Republic of China for corresponding Chinese Patent Application No. 200580030022.1 dated May 23, 2008.
Notification of the Second Office Action from the Patent Office of the People's Republic of China for corresponding Chinese Patent Application No. 200580030022.1 dated Feb. 6, 2009.
Official Action from the Patent Office of the Russian Federation for corresponding Russian Application No. 2007112934/04(014052) dated Jan. 11, 2009.
Official Action from the Patent Office of the Russian Federation for corresponding Russian Application No. 2007112934/04(014052) dated Mar. 29, 2008.
Official letter from IP Austrailia dated Dec. 1, 2009 of Examiner's first report for corresponding Australian Patent Application No. 2005282537.
Official letter from Korean Patent Office for corresponding Korean Patent Application No. 10-2007-7007932 dated Aug. 19, 2009. A concise statement of relevance is provided.

* cited by examiner

*Primary Examiner* — Randy Boyer
(74) *Attorney, Agent, or Firm* — Kevin M. Carroll

(57) ABSTRACT

The present invention is directed to catalytic cracking additives comprising a metals trapping material; and a high activity catalyst. The present invention is directed to processes for the catalytic cracking of feedstock comprising contacting said feedstock under catalytic cracking conditions with a composition comprising a bulk catalyst and a catalytic cracking additive, wherein the catalytic cracking additive comprises a metals trapping material; and a high activity catalyst. The invention is also directed to processes for increasing the performance of a bulk catalyst in the presence of at least one metal comprising contacting a feedstock with a catalytic cracking additive comprising a metals trapping material; and a high activity catalyst.

18 Claims, 3 Drawing Sheets

ADDITIVES FOR METAL CONTAMINANT REMOVAL

CROSS-REFERENCE TO RELATED APPLICATIONS

The present application is a divisional of U.S. patent application Ser. No. 11/220,234, filed Sep. 6, 2005, now abandoned which in turn claims the benefit of U.S. Provisional Patent Application Ser. No. 60/608,038, filed on Sep. 8, 2004, both of which are hereby incorporated by reference herein in their entireties.

Throughout this application, various publications are referenced. The disclosures of these publications in their entireties are hereby incorporated by reference into this application in order to more fully describe the state of the art as known to those skilled therein as of the date of the invention described and claimed herein.

The disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention provides compositions and methods for mitigating the deleterious effect of metal contaminants on catalytic cracking.

BACKGROUND OF THE INVENTION

Catalytic cracking is a petroleum refining process that is applied commercially on a very large scale. A majority of the refinery gasoline blending pool in the United States is produced by this process, with almost all being produced using the fluid catalytic cracking ("FCC") process. In the FCC process, heavy hydrocarbon fractions are converted into lighter products by reactions taking place at high temperature in the presence of a catalyst, with the majority of the conversion or cracking occurring in the gas phase. The FCC feedstock is thereby converted into gasoline, distillate and other liquid cracking products as well as lighter gaseous cracking products of four or fewer carbon atoms. These products, liquid and gas, consist of saturated and unsaturated hydrocarbons.

In FCC processes, feedstock is injected into the riser section of a FCC reactor, where it is cracked into lighter, more valuable products by contacting hot catalyst that has been circulated to the riser-reactor from a catalyst regenerator. As the endothermic cracking reactions take place, heavy carbon is deposited onto the catalyst. This heavy carbon, known as coke, reduces the activity of the catalyst and the catalyst must be regenerated to revive its activity. The catalyst and hydrocarbon vapors are carried up the riser to the disengagement section of the FCC reactor, where they are separated. Subsequently, the catalyst flows into a stripping section, where the hydrocarbon vapors entrained with the catalyst are stripped by steam injection. Following removal of occluded hydrocarbons from the spent cracking catalyst, the stripped catalyst flows through a spent catalyst standpipe and into the catalyst regenerator.

Typically, catalyst is regenerated by introducing air into the regenerator and burning off the coke to restore catalyst activity. These coke combustion reactions are highly exothermic and as a result, heat the catalyst. The hot, reactivated catalyst flows through the regenerated catalyst standpipe back to the riser to complete the catalyst cycle. The coke combustion exhaust gas stream rises to the top of the regenerator through the regenerator flue. The exhaust gas generally contains nitrogen oxides (NOx), sulfur oxides (SOx), carbon monoxide, carbon dioxide, ammonia, nitrogen, and oxygen.

The performance of a fluid catalytic cracking unit can be measured by the conversion of crude hydrocarbon feedstock into useable products such as gasoline. With the addition of a catalytic cracking catalyst, conversion will increase, but so will the production of undesirable side products including coke and hydrogen gas. It is desirable to increase the conversion of an FCC unit while minimizing the increase in coke and $H_2$ byproducts.

The presence of metal contaminants in feedstock presents a serious problem. Common metal contaminants include iron, nickel, sodium, and vanadium. Some of these metals can promote dehydrogenation reactions during the cracking sequence, which can result in increased amounts of coke and light gases at the expense of gasoline production. Metal contaminants can also have a detrimental effect on cracking products. Metal contaminants can deposit on the catalyst and affect its stability and crystallinity. In some cases, the catalyst can be deactivated by the metal contaminants. During the regeneration step, metals present within the catalyst can volatize under the hydrothermal conditions and re-deposit on the catalyst.

For example, vanadium contaminants in feedstock can poison the cracking catalyst and reduce its activity. One theory to explain this poisoning mechanism is that vanadium compounds in the feedstock can become incorporated into the coke deposited on the cracking catalyst, and are then oxidized to vanadium pentoxide in the regenerator as the coke is burned off. Vanadium pentoxide can react with water vapor in the regenerator to form vanadic acid, which can then react with the cracking catalyst to destroy its crystallinity and reduce its activity.

Because compounds containing vanadium and other metal contaminants cannot generally be removed from the FCC unit as volatile compounds, the usual approach has been to passivate these compounds under the conditions encountered during the cracking process. Passivation can involve incorporating additives into the cracking catalyst or adding separate additive particles into the FCC unit along with the cracking catalyst. These additives can preferentially combine with the metal contaminants and act as "traps" or "sinks" so that the active component of the cracking catalyst is protected. Metal contaminants can then be removed along with the catalyst that is withdrawn from the unit during its normal operation. Fresh metal passivating additives can then be added to the unit, along with makeup catalyst, in order to affect a continuous withdrawal of the detrimental metal contaminants during operation of the FCC unit. Depending on the level of metal contaminants in the feedstock, the quantity of additive can be varied relative to the makeup catalyst in order to achieve the desired degree of metals passivation.

Industrial facilities are continuously trying to find new and improved methods to increase the conversion of an FCC unit while minimizing the increase in coke and $H_2$ byproducts. The invention is directed to these and other important ends.

SUMMARY OF THE INVENTION

The present invention is directed to catalytic cracking additives comprising a metals trapping material; and a high activity catalyst. The present invention is directed to processes for the catalytic cracking of feedstock comprising contacting said feedstock under catalytic cracking conditions with a composition comprising a bulk catalyst and a catalytic cracking additive, wherein the catalytic cracking additive comprises a metals trapping material; and a high activity catalyst. The invention is also directed to processes for increasing the performance of a bulk catalyst in the presence of at least one metal comprising contacting a feedstock with a catalytic cracking additive comprising a metals trapping material; and a high activity catalyst.

DETAILED DESCRIPTION OF THE INVENTION

Figure 1:
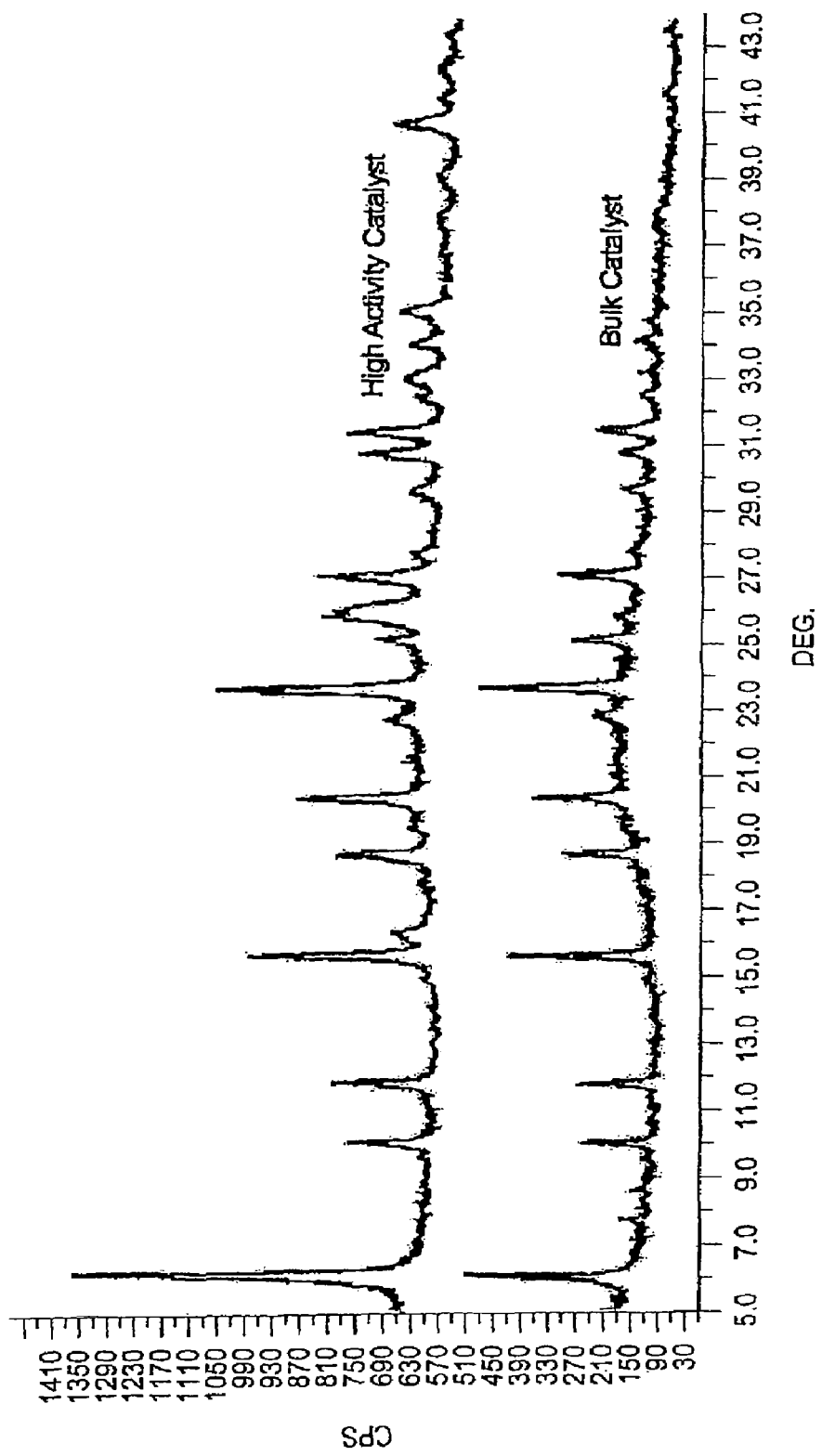
FIG. 1 shows X-ray diffraction ("XRD") patterns of a high activity catalyst and a bulk catalyst.

The present invention is directed to catalytic cracking additives comprising a metals trapping material; and a high activity catalyst. The present invention is directed to processes for the catalytic cracking of feedstock comprising contacting said feedstock under catalytic cracking conditions with a composition comprising a bulk catalyst and a catalytic cracking additive, wherein the catalytic cracking additive comprises a metals trapping material; and a high activity catalyst. The invention is also directed to processes for increasing the performance of a bulk catalyst in the presence of at least one metal comprising contacting a feedstock with a catalytic cracking additive comprising a metals trapping material and a high activity catalyst.

The term "XRD" as used herein means x-ray diffraction.

The term "FCC" as used herein means fluid catalytic cracking.

The term "Re" as used herein means rare earth.

Applicant has surprisingly discovered that the catalytic cracking additives of the invention can increase catalytic conversion but without increased coke or gas production.

Applicant has recognized that catalytic cracking is a two-step process with respect to metal contaminants that can be present in feedstock, wherein 1) metal contaminants are deposited on catalyst particles, along with byproducts including coke, under the riser/reactor conditions in an FCC unit; and 2) catalyst particles containing metals are exposed to steam in order to regenerate the catalyst particles.

Without wishing to be bound by theory, applicant believes that metal contaminants should be removed from the catalyst particles in order to preserve their catalytic abilities. This physical removal of metal contaminants is needed regardless of whether traditional metals passivating agents that can prevent metals contamination of the catalyst particles are present in the riser/reactor. Applicant further believes that metal contaminants are volatile and can migrate within or from catalyst particles in the presence of steam and high temperature, such as under conditions that are effective to regenerate the catalyst particles. Applicant believes that in the presence of steam and high temperature, the catalytic cracking additives herein can function by preferentially adsorbing volatilized metal contaminants, which had been deposited on the catalyst particles.

I. Catalytic Cracking Additives

In one embodiment is provided a catalytic cracking additive comprising a metals trapping material and a high activity catalyst.

In one embodiment, the metals trapping material and the high activity catalyst comprise separate particles. In one embodiment, the metals trapping material and the high activity catalyst particles are added concurrently to the catalytic cracking unit.

In another embodiment, the metals trapping material and the high activity catalyst are within the same particle.

a) Metals Trapping Material

In one embodiment, the metals trapping material comprises a calcium-containing compound, a magnesium-containing compound, or a combination thereof.

In one embodiment, the metals trapping material is a low-density material. In one embodiment, the metals trapping material has a density that is from about 0.50 g/cc to about 1.0 g/cc. In another embodiment, the density is from about 0.7 to about 0.9 g/cc. In one embodiment, the density is from about 0.50 g/cc to about 0.70 g/cc. In another embodiment, the metals trapping material has a density that is less than about 0.70 g/cc; less than about 0.69 g/cc; less than about 0.68 g/cc; less than about 0.67 g/cc; less than about 0.66 g/cc; less than about 0.65 g/cc; less than about 0.60 g/cc; or less than about 0.55 g/cc.

In one embodiment, the metals trapping material is a porous material. In one embodiment, the metals trapping material has a porosity that is greater than about 0.40 cc/g as determined by a water sorption technique. In another embodiment, the metals trapping material has a porosity that is greater than about 0.45 cc/g; greater than about 0.50 cc/g; greater than about 0.55 cc/g; or greater than about 0.60 cc/g.

In one embodiment, the metals trapping material is a low-density and high porosity material. In one embodiment, the metals trapping material has a density that is less than about 0.70 g/cc, and a porosity that is greater than about 0.40 cc/g. Applicant believes that a metals trapping material that is low-density and high porosity can preferentially absorb volatile metal contaminants in the presence of steam and high temperature. One of skill in the art will recognize that the porosity of a material can be a function of the density of the material.

In one embodiment, the metals trapping material comprises a hydrotalcite-like compound, a silica- and alumina-containing compound, a mixed metal oxide, or a combination thereof.

i) Hydrotalcite-Like Compounds

In one embodiment, the metals trapping material is a hydrotalcite-like compound. Hydrotalcite-like compounds are characterized by structures having positively charged layers that are separated by interstitial anions and/or water molecules. Exemplary natural minerals that are hydrotalcite-like compounds include meixnerite, pyroaurite, sjogrenite, hydrotalcite, stichtite, reevesite, eardleyite, mannaseite, barbertonite and hydrocalumite. Other hydrotalcite-like compounds and methods for making them are described by Cavani et al, *Catalysis Today*, 11: 173-301 (1991), the disclosure of which is incorporated by reference herein in its entirety.

In other embodiments, the hydrotalcite-like compound can be a compound of formula (I), (II), (III) and/or (IV):

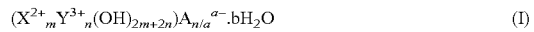

$$(X^{2+}{}_m Y^{3+}{}_n (OH)_{2m+2n}) A_{n/a}{}^{a-} \cdot b H_2O \qquad (I)$$

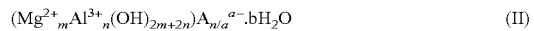

$$(Mg^{2+}{}_m Al^{3+}{}_n (OH)_{2m+2n}) A_{n/a}{}^{a-} \cdot b H_2O \qquad (II)$$

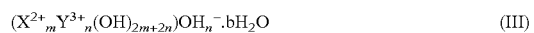

$$(X^{2+}{}_m Y^{3+}{}_n (OH)_{2m+2n}) OH_n{}^- \cdot b H_2O \qquad (III)$$

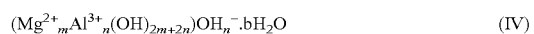

$$(Mg^{2+}{}_m Al^{3+}{}_n (OH)_{2m+2n}) OH_n{}^- \cdot b H_2O \qquad (IV)$$

where X is magnesium, calcium, zinc, manganese, cobalt, nickel, strontium, barium, copper or a mixture of two or more thereof; Y is aluminum, manganese, iron, cobalt, nickel, chromium, gallium, boron, lanthanum, cerium or a mixture of two or more thereof; A is $CO_3$, $NO_3$, $SO_4$, Cl, OH, Cr, I, $SiO_3$, $HPO_3$, $MnO_4$, $HGaO_3$, $HVO_4$, $ClO_4$, $BO_3$ or a mixture of two or more thereof; a is 1, 2 or 3; b is between 0 and 10; and m and n are selected so that the ratio of m/n is about 1 to about 10.

In one embodiment, the hydrotalcite-like compound is hydrotalcite, i.e., $Mg_6Al_2(OH)_{16}CO_3.4H_2O$. In another embodiment, the hydrotalcite-like compound is $Mg_6Al_2(OH)_{18}.4.5H_2O$. The hydrotalcite-like compounds, compositions and/or shaped bodies of the invention can be made by the methods described in U.S. Pat. No. 6,028,023.

In one embodiment, the hydrotalcite-like compound is a solid solution comprising magnesium and aluminum in a ratio of about 1:1 to about 6:1.

ii) Silica- and Alumina-Containing Compounds

In one embodiment, the metals trapping material is an aluminosilicate material.

In one embodiment, the aluminosilicate material is a crystalline material, a quasi-crystalline material, an amorphous material, or a combination thereof.

In another embodiment, the aluminosilicate material contains calcium, and the predominant metals trapping capability is performed by the calcium component.

In one embodiment, the aluminosilicate material contains no zeolitic component.

iii) Mixed Metal Oxides

In one embodiment, the metals trapping material is a mixed metal oxide. As used herein the term "mixed metal oxide" means a chemical compound in which oxygen is combined with two or more metals.

In one embodiment, the mixed metal oxide is a magnesium aluminate.

Mixed metal oxide compounds contemplated in one embodiment of the present invention are described, for example, in co-pending U.S. Ser. Nos. 60/527,258 and 60/576,146. In one embodiment, the mixed metal oxide is a solid solution magnesium aluminate comprising magnesium and aluminum in a ratio of about 1:1 to about 6:1, wherein the calcined form of the solid solution magnesium aluminate has an X-ray diffraction pattern displaying at least a reflection at a two theta peak position at about 43 degrees and about 62 degrees, and wherein the mixed metal oxide is a magnesium- and aluminum-containing compound that has not been derived from a hydrotalcite-like compound.

In one embodiment, the mixed metal oxide is a spinel. In another embodiment, the mixed metal oxide is a magnesium aluminate spinel.

In another embodiment, the mixed metal oxide is derived from a hydrotalcite-like compound, for example by collapsing the hydrotalcite-like compound.

The mixed metal oxide compounds, compositions and/or shaped bodies in one embodiment of the invention can be made by the methods described in U.S. Pat. No. 6,028,023.

iv) Form of Metals Trapping Materials

In one embodiment, the metals trapping material is in the form of a solid solution. In one embodiment, the metals trapping material is used per se in the catalytic cracking additive. In one embodiment, the metals trapping material is in the form of a shaped body. In one embodiment, the shaped bodies are dried, calcined or a mixture thereof.

In one embodiment, the metals trapping materials can further comprise one or more other metal components such as metals of antimony, bismuth, cadmium, calcium, cerium, chromium, cobalt, copper, dysoprosium, erbium, europium, gadolinium, germanium, gold, holmium, iridium, iron, lanthanum, lead, magnesium, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. The metals can be in an elemental state and/or can be in the form of metal oxides, metal hydroxides, metal sulfides, metal halides, or mixtures of two or more thereof. Some or all of the metal components can also be present as organic or inorganic salts, including, for example, metal nitrate salts and/or metal acetate salts. In one embodiment, the aqueous reaction mixture further comprises calcium (e.g., CaO, $Ca(OH)_2$, or $CaCO_3$), magnesium (e.g., MgO, $Mg(OH)_2$, or $MgCO_3$), or a combination thereof. The one or more metal components (or oxides, sulfides, and/or halides thereof) can be present in the metals trapping material in an amount up to about 50% by weight; up to about 40% by weight; up to about 30% by weight; or from about 1% to about 25% by weight; or from about 2% to about 20% by weight, calculated as the oxide equivalent. The one or more other metal components can be added to the metals trapping material at the same time as the components of the metals trapping material.

In another embodiment, the invention provides shaped bodies comprising metals trapping materials and one or more metal components. In another embodiment, the metals trapping material is in the form of a solid solution. In one embodiment, the metal in the metal component is antimony, bismuth, cadmium, calcium, cerium, chromium, cobalt, copper, dysoprosium, erbium, europium, gadolinium, germanium, gold, holmium, iridium, iron, lanthanum, lead, magnesium, manganese, molybdenum, neodymium, nickel, niobium, osmium, palladium, platinum, praseodymium, promethium, rhenium, rhodium, ruthenium, samarium, scandium, selenium, silicon, silver, sulfur, tantalum, tellurium, terbium, tin, titanium, tungsten, thulium, vanadium, ytterbium, yttrium, zinc, or a mixture of two or more thereof. In another embodiment, the metal in the metal component is calcium, magnesium, or a mixture thereof. In one embodiment, the shaped bodies are dried, calcined or a mixture thereof.

In another embodiment, the invention provides one or more shaped bodies comprising metals trapping material and a support. In another embodiment, the metals trapping material is in the form of a solid solution. In one embodiment, the support is a spinel, hydrotalcite-like compound, magnesium acetate, magnesium nitrate, magnesium chloride, magnesium hydroxide, magnesium carbonate, magnesium formate, aluminum titanate, zinc titanate, zinc aluminate, zinc titanate/zinc aluminate, aluminum zirconate, calcium oxide, calcium aluminate, aluminum nitrohydrate, aluminum hydroxide compound, aluminum-containing metal oxide compound (e.g., other than alumina or aluminum hydroxide compounds), aluminum chlorohydrate, titania, zirconia, clay (e.g., halloysite, rectorite, hectorite, montmorillinite, synthetic montmorillinite, sepiolite, activated sepiolite, kaolin), clay phosphate material, zeolite, or a mixture of two or more thereof. In one embodiment, the support is zinc titanate, zinc aluminate, or zinc titanate/zinc aluminate. Methods for making such compositions are described, for example, in WO 99/42201. In one embodiment, the shaped bodies can are dried, calcined or a mixture thereof.

In another embodiment, the invention provides shaped bodies comprising metals trapping material; one or more metal components; and a support. In another embodiment, the metals trapping material is in the form of a solid solution. In one embodiment, the shaped bodies are dried, calcined or a mixture thereof.

In some embodiments of the invention described herein, the metal components are present in an amount of up to about 50% by weight; from about 0.1% by weight to about 40% by weight; from about 1% by weight to about 30% by weight; from about 1% by weight to about 25% by weight; from about 1% by weight to about 20% by weight; from about 1% by weight to about 15% by weight; or from about 1% by weight to about 10% by weight, calculated as the oxide equivalent. In one embodiment, the solid support is present in an amount up to about 50% by weight; from about 1% by weight to about 30% by weight; from about 1% by weight to about 20% by weight; from about 1% by weight to about 15% by weight; from about 1% by weight to about 10% by weight; or from about 1% by weight to about 5% by weight.

v) Amount of Metals Trapping Materials

In one embodiment, the metals trapping material comprises from about 2% to about 98% of the catalytic cracking additive by weight. In one embodiment, the metals trapping material comprises from about 30% to about 95% of the catalytic cracking additive by weight. In one embodiment, the metals trapping material comprises from about 30% to about 60%; or from about 40% to about 60% of the catalytic cracking additive by weight. In another embodiment, the metals trapping material comprises from about 60% to about 95%; or from about 70% to about 90% of the catalytic cracking additive by weight.

b) High Activity Catalysts

As used herein, the term "high activity catalyst" means a catalyst that has a higher percentage of zeolite and/or a higher overall surface area and/or a higher overall crystallinity than a bulk catalyst. In one embodiment, the high activity catalyst has at least about 1.5 times the percentage of zeolite and/or 1.5 times the overall surface area and/or 1.5 times overall crystallinity than a bulk catalyst. In another embodiment, the high activity catalyst has at least about 2.0 times the percentage of zeolite and/or overall surface area and/or overall crystallinity than a bulk catalyst; or at least about 2.5 times the percentage of zeolite and/or overall surface area and/or overall crystallinity than a bulk catalyst; or at least about 3.0 times the percentage of zeolite and/or overall surface area and/or overall crystallinity than a bulk catalyst; or at least about 3.5 times the percentage of zeolite and/or overall surface area and/or overall crystallinity than a bulk catalyst; or at least about 4.0 times the percentage of zeolite and/or overall surface area and/or overall crystallinity.

As an example, FIG. 1 shows a conventionally prepared Y zeolite bulk catalyst (bottom trace) compared with a high activity Y zeolite catalyst component of the present invention (top trace). Comparing the Y zeolite XRD peak at about 6.3 degrees shows significantly more diffracted intensity with the high activity catalyst. More diffracted intensity is indicative of the increased crystallinity of the high activity catalyst of the top trace. More diffractive intensity also indicates a higher zeolite content of the high activity catalyst, and can be indicative of the subsequent higher activity of the high activity catalyst.

i) Zeolites

In one embodiment, the high activity catalyst is a zeolite. In one embodiment, the high activity catalyst is an in situ synthesized zeolite. The zeolites can be stabilized with rare earths, for example, in an amount of from about 0.1 to about 10% by weight. Catalysts including zeolites can contain varying amounts of rare earth compounds. These rare earth compounds can be present during the synthesis of the zeolite, or can be exchanged onto the zeolite following its synthesis. Rare earth-stabilized zeolites are typically denoted "REY".

The zeolites can also be stabilized with steam, including, for example, steam stabilized Y zeolite, known as "USY".

In one embodiment, the zeolite is zeolite X, Y zeolite, zeolite A, zeolite L, zeolite ZK-4, beta zeolite, faujasite, or a combination thereof. In another embodiment, the high activity catalyst is a large pore zeolite. In one embodiment, the high activity catalyst is beta zeolite, Y zeolite, faujasite, or a combination thereof. In another embodiment, the high activity catalyst is rare-earth stabilized beta zeolite, rare-earth stabilized Y zeolite, rare-earth stabilized faujasite, or a combination thereof.

In one embodiment, the high activity catalyst has an overall surface area of greater than about 350 $m^2/gr$; or greater than about 400 $m^2/gr$; or greater than about 450 $m^2/gr$. In one embodiment, the high activity catalyst has an overall surface area of about 400 $m^2/gr$.

Exemplary high activity catalysts according to the present invention include, for example, catalysts available commercially from Engelhard Corporation under the trade name Converter™.

ii) Amount of High Activity Catalysts

In one embodiment, the high activity catalyst comprises from about 5% to about 60% of the catalytic cracking additive by weight. In one embodiment, the high activity catalyst comprises from about 5% to about 40%; or from about 10% to about 30% of the catalytic cracking additive by weight. In another embodiment, the high activity catalyst comprises from about 40% to about 60% of the catalytic cracking additive by weight.

II. Processes for Catalytic Cracking

In one embodiment is provided a circulating inventory of catalyst particles in a fluid catalytic cracking process, wherein from about 2% to about 80% by weight of said circulating inventory comprises the catalytic cracking additives as described above.

In one embodiment is provided processes for the catalytic cracking of feedstock comprising contacting said feedstock under catalytic cracking conditions with a composition comprising a bulk catalyst and a catalytic cracking additive, wherein the catalytic cracking additive comprises a metals trapping material and a high activity catalyst.

In another embodiment is provided processes for improving FCC catalyst performance from a fluid catalytic cracking unit by adding the additives described herein to an FCC unit.

In one embodiment is provided processes for increasing the performance of a bulk catalyst in the presence of at least one metal comprising contacting a feedstock with a catalytic cracking additive, wherein the catalytic cracking additive comprises a metals trapping material and a high activity catalyst. In another embodiment, the catalytic cracking additive increases the catalytic conversion of feedstock. In one embodiment, the catalytic cracking additive increases gasoline production from feedstock. In one embodiment, the catalytic cracking additive increases LPG production from feedstock. In another embodiment, the catalytic cracking additive decreases LCO production from feedstock. In one embodiment, the catalytic cracking additive decreases the bottoms production from feedstock. In another embodiment, the catalytic cracking additive decreases the coke production from feedstock. In one embodiment, the catalytic cracking additive decreases hydrogen gas production from feedstock.

In one embodiment, the catalytic cracking additive mitigates the decrease in crystallinity of the bulk catalyst. In one embodiment, the catalytic cracking additive mitigates the reduction in the peak area of the 2-theta peak at 6.3 degrees of the bulk catalyst. In one embodiment, the catalytic cracking additive mitigates the reduction in the surface area of the bulk catalyst.

a) Feedstock

Any conventional FCC feedstock can be used in the FCC unit. The feedstock can range from the typical, such as petroleum distillates or residual stocks, either virgin or partially refined, to the atypical, such as coal oils and shale oils. The feedstock can contain recycled hydrocarbons, such as light and heavy cycle oils which have already been subjected to cracking. Exemplary feedstocks include gas oils, vacuum gas oils, atmospheric resids, and vacuum resids.

b) Catalytic Cracking Conditions

In one embodiment, the catalytic cracking additives can be added to the riser or regenerator of an FCC unit. In another embodiment, the catalytic cracking additives are added to the regenerator of an FCC unit. In one embodiment, the catalytic cracking additives are added to an FCC unit containing bulk catalyst.

The catalytic cracking additives and bulk catalysts can be introduced into the FCC unit by manually loading via bags or drums. The catalytic cracking additives and bulk catalysts can also be introduced into the FCC unit by automated addition systems, as described, for example, in U.S. Pat. No. 5,389,236. To introduce the catalytic cracking additives to an FCC unit, the catalytic cracking additives can be pre-blended with bulk catalysts and introduced into the unit as one system. Alternatively, the catalytic cracking additives and bulk catalysts can be introduced into the FCC unit via separate injection systems. In another embodiment, the catalytic cracking additives can be added in a varying ratio to the bulk catalyst. A varying ratio can be determined, for example, at the time of addition to the FCC unit in order to optimize the rate of addition of the catalytic cracking additives.

Conventional riser cracking conditions can be used. Typical riser cracking reaction conditions include catalyst/oil ratios of about 0.5:1 to about 15:1 and a catalyst contact time of about 0.1 to about 50 seconds, and riser top temperatures of from about 900° F. to about 1050° F. In one embodiment, good mixing of feedstock with catalyst in the base of the riser reactor is provided using conventional techniques such as adding large amounts of atomizing steam, use of multiple nozzles, use of atomizing nozzles and similar technology. The base of the riser can comprise a riser catalyst acceleration zone. In one embodiment, the riser reactor can discharge into a closed cyclone system for rapid and efficient separation of cracked products from spent catalyst.

The additives of the invention can be added to any conventional reactor-regenerator systems, to ebullating catalyst bed systems, to systems which involve continuously conveying or circulating catalysts/additives between reaction zone and regeneration zone and the like. In one embodiment, the system is a circulating bed system. Typical of the circulating bed systems are the conventional moving bed and fluidized bed reactor-regenerator systems. Both of these circulating bed systems are conventionally used in hydrocarbon conversion (e.g., hydrocarbon cracking) operations. In one embodiment, the system is a fluidized catalyst bed reactor-regenerator system.

Other specialized riser-regenerator systems that can be used herein include deep catalytic cracking (DCC), millisecond catalytic cracking (MSCC), and resid fluid catalytic cracking (RFCC) systems.

c) Bulk Catalysts

As used herein, the term "bulk catalyst" means any catalyst which can be used for operating an FCC unit under standard catalytic cracking conditions, including those discussed in more detail above.

Any commercially available FCC catalyst can be used as the bulk catalyst. The bulk catalyst can be 100% amorphous, but in one embodiment, can include some zeolite in a porous refractory matrix such as silica-alumina, clay, or the like. The zeolite is usually from about 5 to about 40% of the catalyst by weight, with the rest being matrix or diluent. Conventional zeolites such as Y zeolites, or aluminum deficient forms of these zeolites, such as dealuminized Y, ultrastable Y and ultrahydrophobic Y, can be used. The zeolites can be stabilized with rare earths, for example, in an amount of from about 0.1 to about 10% by weight.

The zeolites that can be used herein include both natural and synthetic zeolites.

Relatively high silica zeolite containing catalysts can be used in the invention. They can withstand the high temperatures usually associated with complete combustion of CO to $CO_2$ within the FCC regenerator. Such catalysts include those containing about 10 to about 40% ultrastable Y or rare earth ultrastable Y.

In one embodiment, the bulk catalyst has a surface area of less than about 300 $m^2$/gr.

In another embodiment, the bulk catalyst has a surface area of about 250 $m^2$/gr.

A suitable bulk catalyst can also include a catalyst that has been synthesized by an in situ technique and then blended with a diluent. This can include, for example, a high activity catalyst, as defined herein, and a diluent. In one embodiment, the bulk catalyst includes from about 5% to about 70% of a high activity catalyst by weight. In another embodiment, the bulk catalyst includes from about 5% to about 40% of a high activity catalyst by weight.

d) Catalytic Cracking Additives

The catalytic cracking additives comprise a metals trapping material and a high activity catalyst, as set forth in more detail above.

In one embodiment, the catalytic cracking additive comprises from about 2% to about 80% of the composition by weight. In one embodiment, the catalytic cracking additive comprises from about 20% to about 60% of the composition by weight. In one embodiment, the catalytic cracking additive comprises from about 40% to about 60% of the composition by weight. In another embodiment, the catalytic cracking additive comprises from about 5% to about 20%; or about 10% of the composition by weight.

e) Other Components

The catalyst inventory can also contain one or more additives in addition to the bulk catalyst and the catalytic cracking additive of the present invention, either present as separate additive particles, or mixed in with each particle of the cracking catalyst. Additives can be added to enhance octane, such as medium pore size zeolites, e.g., ZSM-5 and other materials having a similar crystal structure. Additives can also be added to promote CO combustion; to reduce SOx emissions, NOx emissions and/or CO emissions; to promote catalysis; or to reduce gasoline sulfur.

In one embodiment, the catalytic cracking additive of the present invention also serves to enhance octane, promote CO combustion, reduce SOx emissions, NOx emissions and/or CO emissions, to promote catalysis, or to reduce gasoline sulfur.

EXAMPLES

The following examples are for purposes of illustration only and are not intended to limit the scope of the claims appended hereto.

Example 1

Hydrotalcite-like Compounds

Hydrotalcite compounds were prepared following the methods described herein and in U.S. Pat. No. 6,028,023.

MgO powder (having a surface area of about 100 m$^2$/g) (MAGOX®, Premier Chemicals, Cleveland, Ohio) is slurried in water at a solids level of about 14%. Thereafter, 5.2% technical grade acetic acid is added to the MgO slurry.

Separately, pseudoboehmite (P2® Condea) is dispersed in water at a solids level of 8% to produce an alumina sol.

The MgO slurry and alumina sol are mixed in a container such that the molar ratio of Mg/Al of the preparation was 4:1. Additional water is added to the mixture to adjust the solids content of the mixture to about 9%. The mixture is heated to about 214° F. over a period of about 5 hours. Once heated, 8 dry basis parts of the resulting slurry was mixed with 2 dry basis parts of technical grade calcium hydroxide along with sufficient water to give a final solids content of about 10%. The mixture is then spray dried under standard conditions to produce microspheroidal particles with an average particle size of about 75-80 microns. The product is then calcined in a rotary calciner at an approximate equivalent temperature of about 600° C. for 1 hour. The substance is further hydrated with water to produce a hydrotalcite-like phase. The x-ray diffraction pattern shows that the predominant magnesium aluminum phase was most closely represented by Mg$_6$Al$_2$OH$_{18}$.4.5H$_2$O, as depicted in ICDD card 35-965. This substance is referred to herein as "Metals Trap A". The hydrotalcite-like compound is then collapsed by heating at about 500° C. until a solids content of about 8% is reached. Attrition resistant microspheres with an ASTM 2 hour attrition of about 2.1, apparent bulk density of about 0.72 g/cc, a surface area of about 65 m$^2$/g, and a pore volume of about 0.45 cc/g were obtained.

Example 2

Silica- and Alumina-Containing Compounds

A metals trapping additive containing a calcium oxide active component was prepared by mixing, on an ignited basis, 3 parts calcium hydroxide, 3 parts pseudoboehmite alumina gel, 0.5 parts silica sol and 4 parts kaolin clay. Sufficient excess water was included such that the final solids was approximately 20 weight percent. The resulting slurry was spray dried to an average particle size of about 100 microns and calcined to a final LOI of about 5 weight percent. Attrition resistant microspheres with an ASTM 2 hour attrition of about 1.2, apparent bulk density of about 0.64 g/cc, a surface area of about 60 m$^2$/g, and a pore volume of about 0.54 cc/g were obtained. This substance is referred to herein as "Metals Trap B".

Example 3

Mixed Metal Oxides

Magnesium aluminate was prepared following the methods described herein and in U.S. Pat. No. 6,028,023.

MgO powder (having a surface area of about 100 m$^2$/g) (MAGOX®, Premier Chemicals, Cleveland, Ohio) is slurried in water at a solids level of about 14%. Thereafter, 5.2% technical grade acetic acid is added to the MgO slurry.

Separately, pseudoboehmite (P2® Condea) is dispersed in water at a solids level of 8% to produce an alumina sol.

The MgO slurry and alumina sol are mixed in a container such that the molar ratio of Mg/Al of the preparation was 4:1. Additional water is added to the mixture to adjust the solids content of the mixture to about 9%. The mixture is heated to about 214° F. over a period of about 5 hours. Once heated, 8 dry basis parts of the resulting slurry was mixed with 2 dry basis parts of technical grade calcium hydroxide along with sufficient water to give a final solids content of about 10%. The mixture is then spray dried under standard conditions to produce microspheroidal particles with an average particle size of about 75-100 microns. The product is then calcined in a rotary calciner at an approximate equivalent temperature of about 600° C. for 1 hour to produce a mixed metal oxide of magnesium, calcium and aluminum.

Example 4

Improved FCC Catalyst Performance

To evaluate the performance of the additives, feedstock was catalytically cracked under FCC reactor-like conditions with various bulk catalyst/additive combinations. The bulk catalyst was comparable to commercially available catalysts and formulated with 25% rare earth exchanged Y zeolite in an active matrix of about 30% pseudoboehmite alumina gel and silica sol. The catalyst slurry was spray dried to form microspheroidal particles and then calcined. The catalyst surface area was measured to be about 250 m$^2$/g and the rare earth content on a Re$_2$O$_3$ basis was about 1.3 wt %. The high activity catalyst used was a Y zeolite prepared via an in situ technique from clay microspheres, available commercially from Engelhard Corporation under the trade name Converter™. The surface area was approximately 400 m$^2$/g with a total rare earth content on a Re$_2$O$_3$ basis of about 5%, and the pore volume was about 0.54 cc/g.

Figure 2:
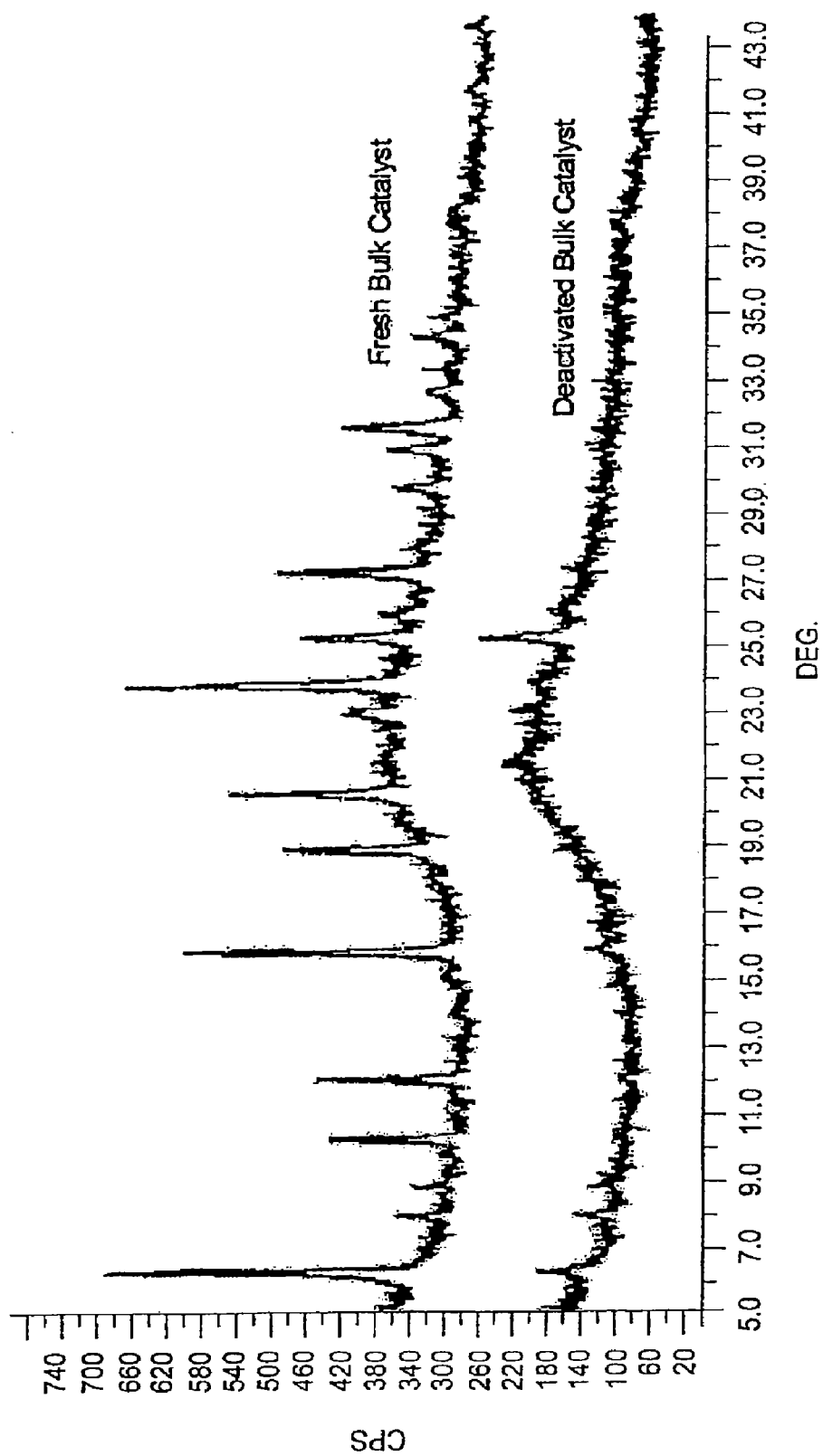
FIG. 2 shows XRD patterns of fresh and deactivated bulk catalyst.

Each catalyst mixture (with or without additive components) was first calcined individually at 732° C. for one hour and then deactivated according to protocol. Vanadium and nickel naphthanates were cracked onto each specific catalyst mixture using a commercially available automated deactivation unit (Kayser Technologies Model D-100). Then the metal contaminated catalyst was steam treated at 800° C. with about 50% steam for about 9 hours. The catalyst mixtures had a final vanadium concentration of about 10,000 ppm and nickel concentration of about 900 ppm. For comparison, a fresh bulk catalyst was also deactivated under the same protocol as the catalyst mixture. An XRD pattern comparison of a bulk catalyst, with and without deactivation, is shown in FIG. 2. FIG. 2 demonstrates that the deactivation process has a significant impact on the crystal structure of the Y zeolite contained within the bulk catalyst.

To measure catalytic performance, deactivated catalyst mixtures were then loaded into a commercially available, laboratory-scale FCC test unit (Kayser Technology ACE model R+). ACE conditions included a reactor temperature of about 985° F., catalyst to oil ratio of about 7, weighted hourly space velocity of about 8, and using a standard US Gulf Coast feedstock.

In Test Run 1A, no additive was used. In Test Runs 1B-1F, the additive was Metals Trap A as described in Example 1 and/or the high activity catalyst Y Zeolite, sold under the trade name Converter™. In Test Runs 1B-1F, the additive made up 10% of the total catalyst mixture. Performance results for Metals Trap A as the metals trapping material are given in Table 1, below. All data is given as weight percentages.

TABLE 1

FCC Catalyst Performance Results for Metals Trap A

| Test Run | % Additive in Catalyst Mixture | Additive | Conversion (%) | LPG Yield | Gasoline Yield | LCO Yield | Bottoms Yield | Coke Yield | $H_2$ Yield |
|---|---|---|---|---|---|---|---|---|---|
| 1A | 0 | None | 60.9 | 14.5 | 30.9 | 21.6 | 17.5 | 12.2 | 1.0 |
| 1B | 10% | High activity catalyst | 60.1 | 13.8 | 31.3 | 21.4 | 18.5 | 11.8 | 0.9 |
| 1C | 10% | Metals Trap A | 70.5 | 20.3 | 38.8 | 15.6 | 13.9 | 8.5 | 0.7 |
| 1D | 10% | 90% Metals Trap A 10% high activity catalyst | 71.4 | 22.1 | 37.5 | 18.4 | 10.2 | 8.9 | 0.6 |
| 1E | 10% | 80% Metals Trap A 20% high activity catalyst | 68.4 | 21.0 | 36.5 | 19.1 | 12.4 | 8.2 | 0.5 |
| 1F | 10% | 70% Metals Trap A 30% high activity catalyst | 69.2 | 20.4 | 36.3 | 19.4 | 11.4 | 9.3 | 0.8 |

In Test Runs 2A-2D, conditions were as above for Test Runs 1A-1F, except that catalyst mixtures had a final vanadium concentration of about 5000 ppm and nickel concentration of 2000 ppm, the catalyst to oil ratio was about 6.0, and using a Mexican Mayan crude feedstock. In Test Run 2A, no additive was used. In Test Runs 2B-2D, the additive was Metals Trap A as described in Example 1 and the high activity catalyst Y Zeolite, sold under the trade name Converter™. In Test Runs 2B-2C, the additive made up 25% of the total catalyst mixture. In Test Run 2D, the additive made up 50% of the total catalyst mixture. Additional performance results for Metals Trap A as the metals trapping material are given in Table 2, below. All data is given as weight percentages.

TABLE 2

FCC Catalyst Performance Results for Metals Trap A

| Test Run | % Additive in Catalyst Mixture | Additive | Conversion (%) | LPG Yield | Gasoline Yield | LCO Yield | Bottoms Yield | Coke Yield | $H_2$ Yield |
|---|---|---|---|---|---|---|---|---|---|
| 2A | 0 | None | 56.8 | 13.3 | 26.4 | 22.2 | 21.0 | 13.6 | 1.2 |
| 2B | 25% | 50% Metals Trap A 50% high activity catalyst | 66.1 | 18.7 | 35.7 | 20.0 | 13.5 | 9.0 | 0.6 |
| 2C | 25% | 40% Metals Trap A 60% high activity catalyst | 65.9 | 18.4 | 35.0 | 20.5 | 13.5 | 9.6 | 0.8 |
| 2D | 50% | 40% Metals Trap A 60% high activity catalyst | 68.1 | 17.4 | 39.7 | 19.7 | 12.2 | 8.3 | 0.6 |

In Test Runs 3A-3F, conditions were as above for Test Runs 1A-1F, except for the additive. In Test Run 3A, no additive was used. In Test Runs 3B-3F, the additive was Metals Trap B as described in Example 2 and/or the high activity catalyst Y Zeolite, sold under the trade name Converter™. In Test Runs 3B-3F, the additive made up 10% of the total catalyst mixture. Performance results for Metals Trap B as the metals trapping material are given in Table 3, below. All data is given as weight percentages.

TABLE 3

FCC Catalyst Performance Results for Metals Trap B

| Test Run | % Additive in Catalyst Mixture | Additive | Conversion (%) | LPG Yield | Gasoline Yield | LCO Yield | Bottoms Yield | Coke Yield | $H_2$ Yield |
|---|---|---|---|---|---|---|---|---|---|
| 3A | 0 | None | 60.9 | 14.5 | 30.9 | 21.6 | 17.5 | 12.2 | 1.0 |
| 3B | 10% | High activity catalyst | 60.1 | 13.8 | 31.3 | 21.4 | 18.5 | 11.7 | 0.9 |
| 3C | 10% | Metals Trap B | 63.7 | 16.4 | 33.4 | 21.3 | 15.0 | 10.6 | 0.9 |
| 3D | 10% | 90% Metals Trap B 10% high activity catalyst | 66.6 | 18.9 | 34.4 | 20.0 | 13.3 | 10.4 | 0.8 |
| 3E | 10% | 80% Metals Trap B 20% high activity catalyst | 66.0 | 18.5 | 34.8 | 20.3 | 13.6 | 9.6 | 0.8 |
| 3F | 10% | 70% Metals Trap B 30% high activity catalyst | 66.7 | 18.0 | 35.1 | 20.6 | 12.7 | 10.3 | 0.9 |

The results reported in Tables 1, 2, and 3 demonstrate a synergistic effect from using an additive that contains both a high activity catalyst and a metals trapping material. Essentially no benefit is seen from using the high activity catalyst alone as an additive, but the benefits of high activity catalyst in combination with a metals trapping material in the additive is generally greater than the benefit of metals trapping material alone. The combination of a high activity catalyst and metals trapping material in an additive increases conversion, increases LPG yield, increases gasoline yield, decreases LCO yield, decreases bottoms yield, and decreases coke yield, and decreases hydrogen gas yield.

Example 5

Crystallinity of Fresh Catalysts

Powder x-ray diffraction using Cu Kα radiation and surface area measurements (single point BET) were first taken of the fresh bulk catalyst and fresh high activity catalyst as described in Example 4. These results are given in Table 4, below.

TABLE 4

Crystallinity of Fresh Catalysts

| | Peak (6.3° 2-θ) Area |
|---|---|
| Fresh Bulk Catalyst | 4236 |
| Fresh High Activity Catalyst | 14554 |

The results reported in Table 4 demonstrate the distinction between a bulk catalyst and a high activity catalyst of the present invention. The area of this XRD pattern peak is a metric that generally indicates the degree of crystallinity of a catalyst. The greater the peak area, the more crystalline the catalyst.

Example 6

Mitigate Loss of Bulk Catalyst Crystallinity

To further evaluate the performance of the instant invention, XRD and surface area measurements were taken of FCC catalysts that had been mixed with Metals Trap A and then deactivated.

In Test Run 1A, no catalytic cracking additive was used. Test Run 1D used the catalytic cracking additive Metals Trap A and high activity catalyst of the present invention. The results are given in Table 5 below.

TABLE 5

Improved Bulk Catalyst Characteristics

| Test Run | Catalyst Mixture | Peak Area (6.3° 2-θ) | Surface Area (m²/g) |
|---|---|---|---|
| 1A | Bulk catalyst | 438 | 68 |
| 1D | Bulk Catalyst with 10% catalytic cracking additive (90% Metals Trap A and 10% high activity catalyst) | 4713 | 102 |

Figure 3:
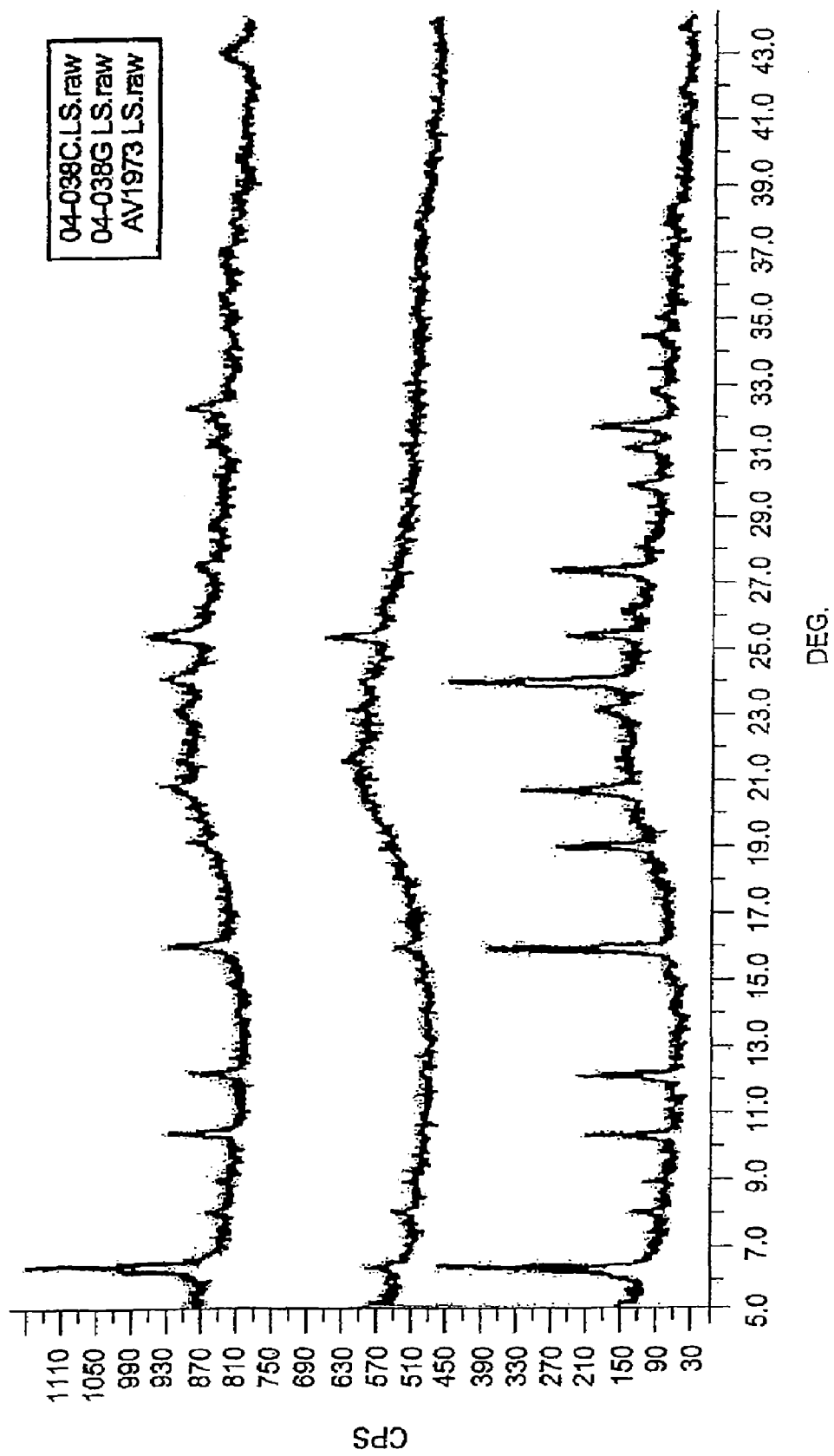
FIG. 3 shows XRD patterns of fresh bulk catalyst, deactivated bulk catalyst, and bulk catalyst in the presence of a catalytic cracking additive of the present invention.

The results reported in Table 5 show that the present invention increases the area of the XRD pattern peak at about 6.3 degrees 2-theta. Generally, the area of this XRD pattern peak is a metric that indicates the degree of crystallinity of the bulk catalyst. The greater the peak area, the more crystalline the catalyst. The actual x-ray diffractogram is shown in FIG. 3. In FIG. 3, the bottom trace shows the diffraction pattern of the fresh, bulk catalyst subjected to no deactivation. Following deactivation, severe loss in crystallinity is observed as shown in the center trace (Test Run 1A). Upon reacting with a catalytic cracking additive of the present invention (Test Run 1D), a significant portion of the crystallinity is preserved as shown in the top trace.

Surface area of the catalyst is another indicator of crystallinity. The results also show that the reduction of the surface area of the bulk catalyst is decreased by catalytic cracking additive of the present invention.

Example 7

Metals Trapping

Scanning Electron Microscopy utilizing Energy Dispersive Spectroscopy (SEM/EDS) was performed on the catalytic cracking additives used in Example 4, above.

FCC catalyst/catalytic cracking additive mixtures were deactivated by being metallated and steamed as described in Example 4. The additive particles were found to contain one or more of the following elements: vanadium, sulfur, silicon, cerium.

Various modifications of the invention, in addition to those described herein, will be apparent to one skilled in the art from the foregoing description. Such modifications are understood to fall within the scope of the appended claims.

What is claimed is:

1. A process for the catalytic cracking of feedstock comprising contacting said feedstock under catalytic cracking conditions with a composition comprising a bulk catalyst, wherein the bulk catalyst has a surface area of less than about 300 m²/g, and a catalytic cracking additive, wherein the catalytic cracking additive comprises:
   a) a metals trapping material; and
   b) a high activity catalyst, wherein the high activity catalyst has a surface area of greater than about 350 m²/g.

2. The process of claim 1, wherein the composition comprises from about 2% to about 80% of the catalytic cracking additive by weight.

3. The process of claim 1, wherein the composition comprises from about 20% to about 60% of the catalytic cracking additive by weight.

4. The process of claim 1, wherein the composition comprises from about 5% to about 20% of the catalytic cracking additive by weight.

5. The process of claim 1, wherein the additive comprises from about 2% to about 98% of the metals trapping material by weight.

6. The process of claim 1, wherein the additive comprises from about 60% to about 95% of he metals trapping material by weight.

7. The process of claim 1, wherein the additive comprises from about 70% to about 90% of the metals trapping material by weight.

8. The process of claim 1, wherein the additive comprises from about 5% to about 40% of the high activity catalyst by weight.

9. The process of claim 1, wherein the metals trapping material and the high activity catalyst comprise separate particles.

10. The process of claim 1, wherein the metals trapping material and the high activity catalyst are within the same particle.

11. The process of claim 1, wherein the metals trapping material comprises a calcium-containing compound, a magnesium-containing compound, or a combination thereof.

12. The process of claim 1, wherein the metals trapping material comprises a non-anionic magnesium- and aluminum-containing compound that has not been derived from a hydrotalcite-like compound, a hydrotalcite-like compound, a silica- and alumina-containing compound, or a combination thereof.

13. The process of claim 1, wherein the high activity catalyst comprises a zeolite.

14. The process of claim 1, wherein the high activity catalyst comprises an in situ-synthesized zeolite.

15. The process of claim 13, wherein the zeolite is zeolite X, Y zeolite, zeolite A, zeolite L, zeolite ZK-4, beta zeolite, ZSM-5 zeolite, faujasite, or a combination thereof.

16. The process of claim 13, wherein the zeolite is Y zeolite, beta zeolite, or a combination thereof.

17. The process of claim 1, wherein the metals trapping material is a vanadium trapping material.

18. The process of claim 1, wherein the bulk catalyst is about 5% to about 40% zeolite.

* * * * *